UNITED STATES PATENT OFFICE.

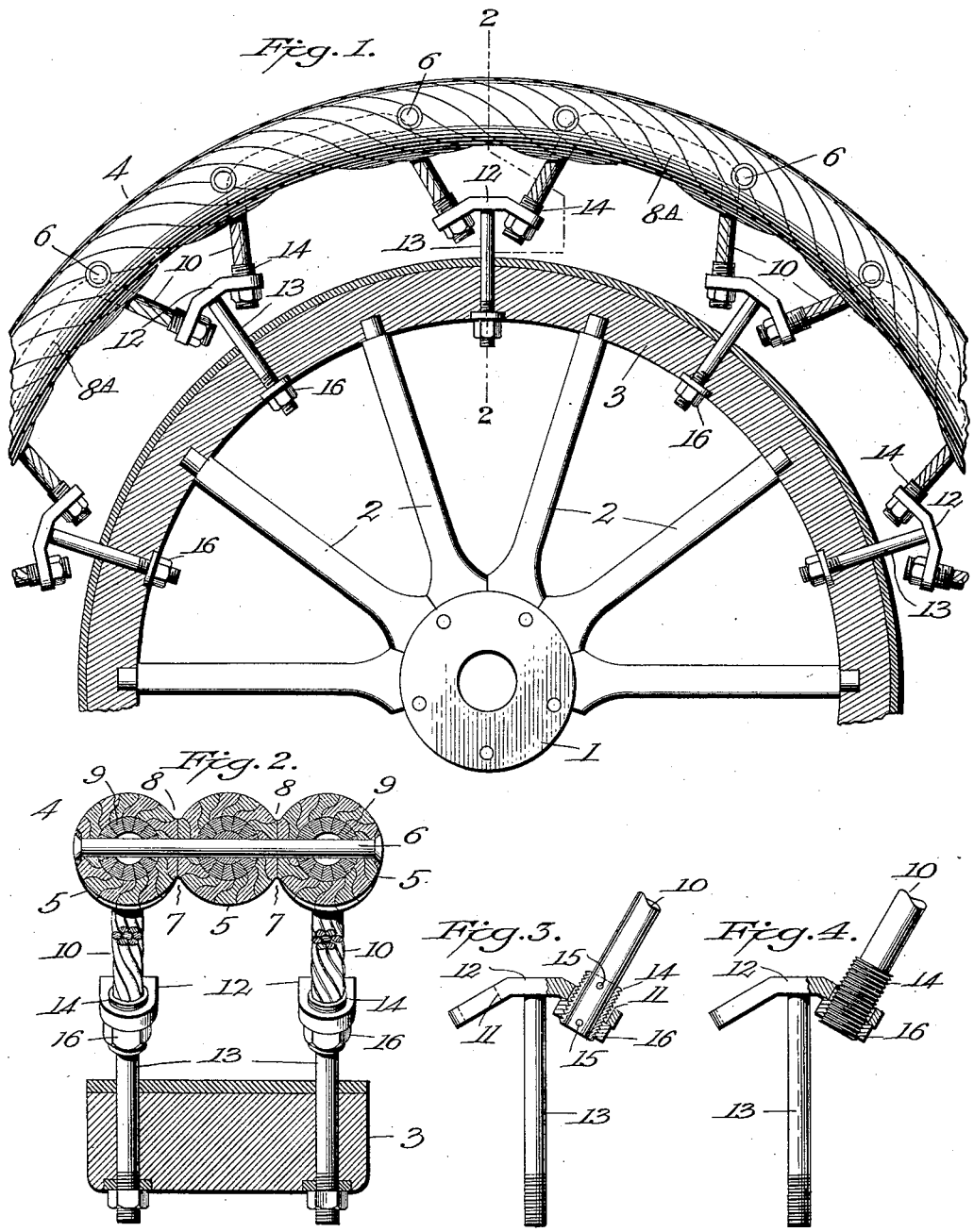

ORREN ALLEN, OF DENVER, COLORADO.

FLEXIBLE SUSPENSION-WHEEL FOR AUTOMOBILES.

1,087,626.   Specification of Letters Patent.   Patented Feb. 17, 1914.

Application filed January 18, 1913. Serial No. 742,902.

*To all whom it may concern:*

Be it known that I, ORREN ALLEN, a citizen of the United States of America, residing in the city and county of Denver and State of Colorado, have invented a new and useful Flexible Suspension-Wheel for Automobiles, of which the following is a specification.

My invention relates to a new and improved flexible suspension wheel for automobiles, and the objects of my invention are: First, to provide a flexible suspension wheel that is composed of a multitudinous number of twisted wires so combined and arranged that they form within themselves and of themselves a flexible suspension tire or a rim to receive a tire of any desired type. Second, to provide an automobile wheel in which a mass of twisted wires are arranged into a non-skidding tire, and in which said tire is adjustably suspended to the felly of an automobile wheel by tension members that form an integral part of it, and in which said tire can be used as a rim to receive any type of a tire desired instead of being used as a tire itself. Third, to provide a non-skidding tire that is suspended under adjustable tension force to the fellies of automobile wheels by spoke-like members that form an integral part of said tire. Fourth, to provide a non-skidding suspension wheel for automobiles, in which a tire is provided that comprises a plurality of wire cable-like members rigidly connected together and having either stiff or flexible core portions projecting through its inner periphery and arranged to adjustably suspend the same from the fellies of automobile wheels. I attain these objects by the mechanism illustrated in the accompanying drawings, in which:

Figure 1, is a view partly in side elevation and partly in section, of a portion of a wheel constructed in accordance with my invention. Fig. 2, is a transverse sectional view on the line 2—2 of Fig. 1. Fig. 3, is a view of one of the tension bolts to which the ends of the tire core sections are secured, a portion of one of said sections being shown in sliding engagement with said bolt. And Fig. 4, is a similar view showing a lock nut for preventing the sliding action of the core section with respect to the bolt.

Similar letters of reference refer to similar parts throughout the several views.

Referring to the drawings,—the numeral 1 designates the hub; 2 the spokes; and 3 the spoke-felly of any commonly used type of automobile wheel; and these parts may be made of wood or metal as desired. Surrounding the felly and at a short predetermined distance from it, I place a tire 4. This tire 4 is an endless tire and is composed of a mass of wires twisted, interwoven, interlaced, or otherwise held together to form a tire that may be of any desired width, but which I preferably make from about one inch to about two inches thick, and from about three to about six inches in width.

My improved tire is made of a proper length of cable or mass of wires, the ends of which are connected together into an endless tire by the electric or the oxy-hydrogen or any other system of welding, or they may be spliced or connected together by any suitable means, and is preferably made of spring steel wires especially on its tread surface, where locking wires are preferably used of the greatest strength and durability obtainable, so that a wire ring tire is obtained of great inherent resiliency, flexibility, and toughness, the tread surface of which should wear for an indefinite period.

My invention contemplates any twisted arrangement of wires that either independent of each other or combined together can be formed into a tire for automobile wheels, and I have illustrated my improved tire in section in Fig. 2, made of three lock wire cable-like sections 5, rigidly riveted together by rivets 6, although bolts or any other suitable means may be employed for rigidly securing the wire cable-like sections together if desired. They are, however, so rigidly compressed together as to compress them enough to form a flat bearing surface 7, between them. This arrangement of the three cable-like sections forms two circumferential grooves 8 around the circumference of the tire, and these grooves are naturally deep enough to form a non-skidding tread portion on the surface of the tire, and if four or five or six wire cable sections were used in making a tire, there would be three or four or five of these non-skidding grooves in its tread surface, while the lock wires that form the tread may be from three-sixteenths to a half inch in depth, depending on the size and load the tire is designed to support when in use on an automobile, thus insuring a very durable as well as a yielding wearing surface.

The lock cable-like sections on the opposite outer edges of the tire are of special construction and of an entirely different construction from an ordinary wire rope cable. They are each provided at their center or core portions with a solid or flexible core 8^A at only certain predetermined and equidistant spaces apart throughout the circumference of the tire, and with hollow core portions 9 intermediate of the core portions. These solid or rope strand cores are bent at their opposite end portions and are extended downwardly through and out of the wire sections a short distance, and they form the suspensory spoke members that support the tire on the felly of the wheel, as will be explained more fully hereinafter. I illustrate these core spokes extending from the end sections only, but they can be formed in and be brought down from the center or intermedial sections if desired, and be secured in like manner to the felly. The rivets 6 are extended through the hollow core space portions or centers 9 of the wire sections, and I preferably place two rivets through the wire sections, and through their hollow core spaces, and preferably position these rivets at the opposite ends of the coreless spaces of the wire sections, so that the opposite end portions of the solid or flexible cores rest against the rivets or are positioned so close to them that when the tire is running on the ground under a load, the flexible radial movement of the tire will permit the spoke portions 10 of the cores to find a bearing against the rivets on the top side of the wheel, and the rivets against the spoke portions of the cores. The spoke end portions 10 of the solid or flexible core portions of these outside wire portions of the wire tire are extended at a forward angle and extend through apertures 11 formed through the opposite ends of a cross bar 12, to which they are adjustably secured by any suitable means. This cross bar is provided with a center bolt 13. The opposite ends of the cross bars extend at a downward sloping angle from each other and from the top of this bolt portion 13, which is arranged to project through apertures formed through the felly to receive them, and through which they project, and are adjustably secured and are arranged to be moved radially by any suitable means. I preferably adjustably secure the spoke ends of the cores by securing a threaded sleeve 14 to their terminal ends by any suitable means, but preferably by rivets 15, which extend through both the sleeves and the cores, and arrange the sleeves so that the rivets will clamp the sleeves and cores rigidly together. The ends of these suspension spokes with their sleeves are of a length relative to the length of the apertures in the cross bar to permit the sleeves to extend into and extend loosely through the apertures 11 in the yoke bars, which are made large enough to receive them, and nuts 16 are threaded to the inner ends of these sleeves. Nuts 17 may also be placed on the outer ends of these sleeves as shown in Fig. 4, if desired, either to limit the downward compression of the flexible or solid rigid spokes by setting them at any desired distance on the sleeve above the yoke bars, or by screwing them down tight against the yoke bar and confining any compression movement of the tire over them to the amount they would bendingly yield under compression. My invention, however, contemplates any practical adjustable means of securing the opposing ends of these spokes independently of each other to the felly of the automobile wheel. The yoke bar, however, I preferably arrange so that it can either slide down through the felly a predetermined distance by running the nut outside of the felly upon its sleeve, or these yoke bolts can be secured against movement in the felly if desired by screwing the upper nut down tight against the felly after adjusting the yoke bolt for tension. If desired, the sleeve may be dispensed with when a core spoke of large diameter is used with core spokes of small or of medium diameter, and when using flexible core spokes, the sleeve or an equivalent enlarging device I deem necessary. I preferably make my improved tire with twelve of these core spoke members in the center of the wire end sections of the circumference of the tire, and I also leave twelve hollow or aperture spaces in the center or core of these end sections between the core spoke sections, and as each core has two spoke ends, the wheel will have twenty-four spokes, each of which is an integral part of the very heart of the tire and each spoke of which is adjustably secured under any desired suspension tension independent of the others, and the opposing or opposite spokes of each core are adjustably secured to the felly of the wheel independent of each other. In addition to this, each pair of opposing spokes is secured to a tension bolt, which is adjustably secured to the felly. Consequently, any desired suspension tension force can be given the tire to make the tires suitable for passenger or freight carrying automobiles.

The manner of attaching my improved automobile suspension non-skidding tire to automobile wheels, and its operation, is as follows: The yoke bars are first placed in their respective apertures around the felly, and the tire is placed on the wheel and its core spokes are extended through the apertures in the felly made to receive them. Their lower nuts are then screwed up all around the wheel until the ring tire is drawn radially inward to place it under the desired tension all around the felly of the wheel. Then the pressure against the tread of the tire when the tire and wheel are under a load, results in a radial compression against the spokes at the point of contact with the ground, causing them to bend if secured tightly to the yoke bars or to move down through them a slight or short distance, and this radial compression at the point of contact with the ground exerts a pulling contact on or tension pull on the core spokes on the opposite side of the tire from its ground contact point, and also on the core spokes at the sides of the wheel that are relative to the point of the wheel that is against the ground. The compression of the tire at the ground point causes the core spokes to act as yielding struts when they are secured to the yoke-bars, which would probably be necessary with tires for delivery or freight carrying automobiles, and these core spokes exert an outward pressure against the rivets at the point where the core spokes bend to project through the end sections of the tire, and the cores being at the center of the tire, make not only an integral connection therewith, but the strongest possible connection that could be made.

My invention provides an elastic non-skidding suspension tire and wheel for automobiles that can be varied in weight, strength, and elasticity to meet the requirements of passenger and freight delivery automobiles, and if desired a pneumatic or a solid rubber or other flexible tire can be secured to my tire, in any suitable manner, in which case my tire would become a rim for the tire placed upon it. I have not shown any side plates or flanges on my wheel and tire, as they do not form any part of my invention, but if desired any practical arrangement of side plates or flanges may be used. I have also preferably illustrated my improved wire tire made up of three cable sections of wire, but two or four or five or more of such cable sections may be used if desired, and as many of them as desired may be provided with core spokes and be arranged to be adjustably secured at their ends and also at their center portions to the fellies of the wheel.

Having described my invention what I claim as new and desire to secure by Letters Patent, is:

1. In a non-skidding wire tire for automobiles, the combination of a plurality of separating wire sections combined rigidly together into a tread tire, the outer sections of which are provided with internal core portions that are arranged at predetermined distances apart throughout the circumference of the tire, said cores being provided with extension portions turned down and out of said tire and arranged to be adjustably secured to the felly, said wire sections being so secured together as to form natural depression grooves between them at their meeting joints, and means rigidly securing said wire sections together.

2. In a non-skidding wheel for automobiles, the combination of masses of wires of cable-like form riveted or otherwise rigidly secured together, independent core portions in the center of said masses of wires provided with spoke ends arranged to project from the inner periphery of said tire, coreless spaces between said core portions through which said rivets pass, said spokes being provided with threaded portions and arranged to be adjustably secured to the fellies of automobile wheels, and said wire sections being arranged so as to form circumferential grooves throughout the circumference of the tire, whereby they are enabled to run without slipping laterally.

3. In a wire tire for automobile wheels, provided with a felly, a plurality of adjustable bolts projecting through said felly radially, each of which is provided with a cross bar across its outer end provided with apertures, a wire tire comprising a combined group of twisted wire cable-like members rigidly secured together, the outside end members of which are provided with a row of independent core members separated by non-core portions, each of said core members being provided with extending end portions which are bent to extend through the inner periphery of said tire and to extend beyond it and to extend through the apertures in said cross bar, and arranged and adapted to form spokes, a threaded portion on the ends of said spokes, and a nut or nuts threaded to said threaded end portions of said spokes and arranged to adjustably secure said spokes to the cross bars of the adjustable radial bolts of said felly, and means including rivets for securing said wire cable-like sections together, said sections being so left when so compressed and secured together as to form natural circumferential grooves between them whereby they form non-skidding tires.

4. In a wire tire for automobiles, the combination with fellies of automobile wheels, of the wire cable-like sections secured side by side together, independent core-spoke members arranged in the core portions of the sections of said tire, threaded sleeves on the ends of said core spokes, adjustable tension bolts extending radially through said felly and having a cross bar portion at their outer ends, each end of each cross bar of which is provided with an aperture adapted to receive the threaded sleeve loosely of the ends of said core-spokes, nuts for securing the threaded oppositely disposed ends of said core spokes adjustably and independently of each other to the cross bars of said felly's tension bolts, whereby said wire tire is suspended under an operative suspension tension from said felly.

5. In a wheel as specified, the combination with the felly, of a plurality of surrounding twisted-wire tire sections spaced from said felly and rigidly secured together, the outside sections having a plurality of independent core members, the ends of which project through the sections toward the said felly, tension bolts extending through the felly having apertured cross heads which receive the adjacent ends of two core members, threaded sleeves on the ends of said core members, nuts on said sleeves which bear on the inner sides of the cross heads, and nuts on the inner ends of the tension bolts.

6. In a wheel as specified, the combination with a felly, of a plurality of pairs of substantially T-shaped bolts extending loosely therethrough and having apertures in their heads, twisted-wire tire members surrounding the felly and spaced therefrom, said members being so connected as to form a single band, core sections in the outside tire members, whose ends extend through the tire members, threaded sleeves on said ends, the adjoining ends of each two core sections extending loosely through the apertures in the head of one of the T-shaped bolts, nuts on said sleeves in engagement with opposite sides of the cross heads of the bolts, and nuts on the inner ends of the bolts.

7. In a wheel for automobiles, the combination with a wheel felly, of a resilient tire surrounding and spaced from the said felly, comprising twisted-wire tire members connected to form a single band or tire, tension devices connected to the felly, and core sections, the ends of which extend out through the tire members and are connected to the tension devices.

In testimony whereof I affix my signature in presence of two witnesses.

ORREN ALLEN.

Witnesses:
G. SARGENT ELLIOTT,
JEWEL V. KILEY.

---

Copies of this patent may be obtained for five cents each, by addressing the "Commissioner of Patents, Washington, D. C."